May 26, 1959  E. PODSCHUS ET AL  2,888,322
ALKALINE-EARTH METAL SILICATES
Filed Nov. 29, 1954

INVENTORS:
ERNST PODSCHUS, ODILO KOLLMANN
BY
Oscar L. Spencer
ATTORNEY

United States Patent Office 2,888,322
Patented May 26, 1959

2,888,322

ALKALINE-EARTH METAL SILICATES

Ernst Podschus, Leverkusen-Bayerwerk, and Odilo Kollmann, Leverkusen, Germany, assignors to Farbenfabriken Bayer Aktiengesellschaft, Leverkusen, Germany, a corporation of Germany Application November 29, 1954, Serial No. 471,856

Claims priority, application Germany December 1, 1953

5 Claims. (Cl. 23—110)

The present invention relates to alkaline earth metal silicates of small particle size which are suitable as reinforcing fillers in rubber compositions and which are also useful in other fields. The invention further relates to a process of producing such silicates.

Calcium silicate prepared by precipitating sodium silicate solution with calcium chloride solution with stirring has been proposed to be used as filler, for instance, in rubber compositions. A filler is required to be compounded in a state of finest subdivision but should nevertheless be readily dispersible. For instance, a filler which is incorporated in rubber vulcanizates to impart a reinforcing effect must be applied in particles having a diameter of about 500 Angstrom units. Calcium silicates of such particle size are obtainable according to conventional methods by mixing the solutions with stirring, for instance, by means of a lattice type or grid stirrer or a so-called high powered propeller stirrer under appropriate conditions of concentration. The ultimate particle size of calcium silicates hitherto used was substantially not much below about 500 A. Calcium silicates having an average particle size below 300 A. have not been known so far.

The particle size of a substance can be measured by the electron microscope as well as by determination of the specific surface area by nitrogen adsorption according to Brunnauer, Emmett and Teller (hereinafter abbreviated BET). An average ultimate particle size of silicic acid fillers or calcium silicate fillers of 300 A. corresponds to a surface area according to BET of about 89 m.$^2$/g., provided that the substances do not have a substantial porosity and the particles do not substantially deviate from spherical shape.

It is an object of the present invention to provide readily dispersible alkaline earth metal silicates, particularly calcium silicate of especially small average particle size of 300 A. and less, or of a surface area according to BET of about 89 m.$^2$/g. and more.

It is another object of the present invention to provide a process of producing readily dispersible alkaline earth metal silicates, particularly calcium silicate of especially small average particle size of 300 A. and less, or of a surface area according to BET of about 89 m.$^2$/g. and more.

Further objects of the invention will become apparent as the following description proceeds.

In accordance with the present invention it has been found that alkaline earth metal silicates which have especially small ultimate particle size and are suitable for use as reinforcing fillers in rubber compositions can be produced by reacting a solution of an alkali metal silicate with a solution of an alkaline earth metal chloride with vigorous stirring under high shearing stresses at high velocity so that products having a surface area of about 89 m.$^2$/g. or more, which corresponds to an average ultimate particle size of 300 A. or less, result. Fillers having an ultimate particle size of 300 A. and less can thus be obtained by this process.

Milling apparatus adapted to comminute material to colloidal size and stirrers working at extraordinarily high speed, which produce a high velocity gradient, are particularly suitable to effect a very fast mixing operation under high shearing stresses. It is an essential feature of the invention that the reaction components are contacted in the zone of the maximum velocity gradient where is the maximum shearing stress. The "Kotthoff" mill is very suitable to serve this purpose. In the Kotthoff mill a turbo stirrer rotates at a relatively high number of revolutions (a laboratory mill having a rotor 72 mm. in diameter, which is equipped with 6 or 12 blades, rotates at 2800 revolutions per minute) in a stationary basket, the stator, which is provided all over its circumference with uniformly spaced slots and deflecting plates (15, 30 or 60 plates). The material to be milled, which must be in a fluid condition, is sucked into the rotor at the top and at the bottom, and is given a tangential velocity (e.g. at 2800 revolutions per minute and a diameter of 72 mm.: 10.5 m./sec.), which is suddenly deflected into a radial direction when impinging upon the deflecting plates of the stator. It is preferable to feed one or, if the precipitation process is carried out continuously, both reaction solutions to the central part of the turbo stirrer so that the solutions issue closely above the rotor and are rapidly intimately mixed and immediately reacted in the zone of the maximum velocity gradient.

A suitable alkali metal silicate according to the invention is especially commercial sodium silicate containing $Na_2O$ and $SiO_2$ at a ratio of 1:3 to 1:4, generally 1:3.3. The reaction using, for instance, calcium chloride solution at a stoichiometric proportion gives rise to a precipitate having substantially a proportion of base and acid as is present in the sodium silicate, say about $CaO(SiO_2)_{3.3}nH_2O$. This precipitate is designated as calcium silicate though it is amorphous upon X-ray examination and shows no calcium silicate interferences. Precipitation is effected, for instance, by adding sodium silicate solution to calcium chloride solution in such a manner that the sodium silicate solution issues close by the rotating stirrer, or both solutions are fed continuously so that they enter in the immediate vicinity of the stirrer. In the discontinuous operation using a Kotthoff mill, the calcium chloride solution and, during the further course of precipitation, the reaction product which contains increasing amounts of the resulting precipitate and sodium chloride, is sucked into the mill, whereby calcium chloride immediately reacts under high shearing stresses with the sodium silicate solution in the immediate vicinity of the rotor. In the continuous operation, both solutions enter the mill closely above or below the rotor and immediately react in the zone of the maximum velocity gradient. Since the Kotthoff mill works in the continuous process in a container having a volume capacity which corresponds to the dimensions of the mill, the reaction product is continuously sucked into the mill. It is obvious that the reaction solutions are diluted, as it occurs in the above described discontinuous process. We have failed so far to determine which process proceeds primarily, i.e. whether in the first step the entering solutions are diluted within an extraordinarily short period and then react with one another in the second step, or whether these steps are reversed.

The concentration of the reaction solutions are chosen so that the precipitate is ultimately 0.05–0.4 molar in respect of $CaO(SiO_2)_{3.3}nH_2O$. It is of advantage to apply the sodium silicate solution in fresh dilution at a concentration of between 0.1 and about 0.7 molar, calculated on $Na_2O$. Alternatively, the sodium silicate solution may be employed at higher concentration (for instance, 1.7 mols of $Na_2O$ per liter), which heretofore has been impossible. In this case, the $CaCl_2$ solution has to be kept, of course, at a lower concentration so that the precipitate retains its flowing condition.

In the precipitation process, according to the invention, the ultimate particle size of the calcium silicate depends upon the velocity gradient in the reaction zone. The velocity gradient is to be kept as high as possible so as to obtain products of a surface area of about 89 m.$^2$/g. or more, which corresponds to an average ultimate particle size of 300 A. or less. The resulting ultimate particle size further depends upon the ratio of $CaCl_2$ and sodium silicate; an excess of sodium silicate, even when present only temporarily during precipitation, effects an increase in particle size. The ultimate particle size also depends on the composition of the sodium silicate, i.e., an increase of the ratio of $Na_2O$ and $SiO_2$ leads to increase in the particle size. Besides, the properties of the filler are influenced by the concentration of the reaction solutions.

It appears that the precipitation process using solutions of a concentration where the mixture is just flowable yields the finest ultimate particles. This occurs in the discontinuous process using about 0.4 molar solutions if both solutions are applied at the same concentration. The viscosity of the reaction solutions increases in the course of precipitation and reaches a maximum after feeding about ⅔–¾ of the total amount of sodium silicate to $CaCl_2$ employed at a stoichiometric proportion or in a slight excess (about 5–10%) of calcium chloride. Thereafter, the viscosity is reduced. A lower viscosity is maintained from the beginning if a $CaCl_2$ solution containing NaCl is employed, for instance, a solution obtained as spent lye in the Solvay soda process. The discontinuous precipitation may be carried out with a solution of higher concentration since the reactants are continuously diluted with the reaction solution containing NaCl. As a rule, the viscosity of the precipitate increases as the shearing stresses applied in the process increase.

The flowing conditions of the calcium silicate precipitate are relatively complicated. Whereas the viscosity of the precipitate reduces within the range of relatively low shearing stresses in accordance with a certain thixotropy as the shearing stresses increase, the viscosity finally increases with the application of higher shearing stresses. In the precipitation process carried out in the Kotthoff mill, a concentration of up to about 0.2 mol of calcium silicate per liter may be attained in view of the viscosity conditions in the discontinuous performance; up to 0.3 mol of calcium silicate per liter and more may be used in the continuous precipitation process.

It is a surprising feature of the invention that the products precipitated discontinuously in the precipitation of calcium silicate do not fundamentally differ from the continuously precipitated products. Apparently, the calcium silicate particles which are sucked through the rotor of the precipitating device in the discontinuous process in ever increasing concentration do not act as nuclei.

The precipitation process, according to the invention, yields calcium silicate fillers of a surface area of about 89 m.$^2$/g. and more, which corresponds to an average ultimate particle size of 300 A. and less, after working up in the usual manner by filtering, washing, drying, and grinding. Thus, for instance, products of a surface area of 100–110 m.$^2$/g., which corresponds to particles having a diameter of about 250 A., are readily obtained with the aid of the Kotthoff mill, but also with other devices, for instance, with the Pentax stirrer which has a similar working mechanism. The products thus obtained are readily dispersible; this is probably due to their relatively narrow grain-size distribution curve, i.e. a predominant homodispersity. The products obtained according to the invention are excellently suitable as reinforcing pigments, especially in rubber compositions. They give vulcanizates with mechanical properties which could not be obtained so far by incorporation of calcium silicate pigments.

The invention is further illustrated by the following examples without being restricted thereto:

*Example I*

50 l. of a 0.3 molar calcium chloride solution are reacted with 70 l. of sodium silicate solution being 0.2 molar in respect of $Na_2O$ (ratio of $Na_2O$ and $SiO_2$ is 1:3.3) within about 20 minutes at about 18° C. The individual steps of the reaction are as follows: the $CaCl_2$ solution is placed in an about 200-liter container and recirculated over a 40-liter precipitating vessel which is located at a higher level, and provided with an overflow pipe (pumping capacity: about 1000 liters per hour). A Kotthoff mill having 2800 revolutions per minute, the impeller of which is 72 mm. in diameter, is arranged in the precipitating vessel. The feeding means for the sodium silicate solution terminates closely above the impeller. Thus, the precipitation proceeds in the Kotthoff mill while the $CaCl_2$ solution or the precipitate is continuously recirculated.

After adding the sodium silicate solution, the reaction solution is stirred for 30 minutes and then filtered and washed. The filter cake is dried at 120° C. and ground in a pin mill (a laboratory Kolloplex mill rotating at 12,000 revolutions per minute). For comparison, the same experiment was carried out with a lattice-type grid or stirrer, 150 mm. in width and having a number of revolutions of 300 per minute, under otherwise equal conditions. The surface area of the product precipitated in the Kotthoff mill under high shearing stresses is 88 m.$^2$/g., as is measured according to the Brunnauer, Emmett and Teller method; the product precipitated by means of a customary grid stirrer has a surface area of 47 m.$^2$/g.

The two fillers were incorporated within the following rubber composition:

100.0 parts by weight of sheets and crepe,
60.0 parts by weight of filler,
5.0 parts by weight of zinc oxide,
1.5 parts by weight of stearic acid,
1.0 part by weight of phenyl-β-naphthylamine,
0.8 part by weight of n-diethyl-2-benzothiazylsulfonamide,
1.5 parts by weight of a mixture of:
    40 parts of formamide,
    35 parts of diethylene glycol,
    25 parts of the fatty acid salt of cyclohexylamine,
1.5 part by weight of benzoic acid,
3.0 parts by weight of sulfur;

the vulcanizaton process was unobjectionable in both instances. The table below gives the average values during 5 vulcanization stages (after 10, 20, 30, 45, and 60 minutes) measured as it is customary in rubber technique.

| | Experiment 1, Kotthoff mill | Experiment 2, Grid Stirrer |
| --- | --- | --- |
| Tensile strength | 224 | 220 |
| Hardness (° Shore) | 66 | 60 |
| Tear resistance | 37 | 29 |
| Abrasion loss | 165 | 168 |

The values given in the table prove the superiority of the calcium silicate filler obtained according to the invention in rubber compositions.

*Example II*

10 liters of a sodium silicate solution being 0.4 molar in respect of $Na_2O$, having the molecular ratio $Na_2O:SiO_2$ =1:3.3, are added within about 15 minutes with stirring to 11 liters of an 0.4 molar $CaCl_2$ solution placed in a 30-liter vessel. The first experiment is carried out with an ordinary-type laboratory grid stirrer of glass (about 300 revolutions per minutes). In the second experiment, a Kotthoff mill is used and 0.4 molar sodium silicate solution is added through a pipe line terminating closely above the impeller having 2800 revolutions per minute. The calcium silicate precipitate obtained in the Kotthoff mill is more highy viscous and looks more vitreous than the precipitate obtained with the grid stirrer. Both precipitates are filtered off—the filtering process of the more finely divided calcium silicate precipitated under high shearing stresses takes a longer time—washed and dried at about 110° C. Thereupon, both products are ground in a high speed pin mill. The product precipitated with the grid stirrer has a surface area of 43 m.²/g., which corresponds to an average particle size of 700 A., the surface area of the product precipitated with the Kotthoff mill is 106 m.²/g., which corresponds to an average particle size of about 250 A. The calcium silicate precipitated under high shearing stresses, which has a smaller particle size, is distinctly superior in its reinforcing effect in rubber compositions to the comparison product and other previously known calcium silicate fillers.

*Example III*

0.4 molar $CaCl_2$ solution and 0.4 molar sodium silicate solution (the ratio of $Na_2O$ and $SiO_2$ is 1:3.3) are withdrawn from glass bulbs by means of siphon pipes and continuously fed to a Kotthoff mill working in a 20-liter container which is provided with an overflow pipe. The rate of feeding the sodium silicate solution is adjusted to 20 liters per hour, whereas 24 liters of $CaCl_2$ solution are introduced per hour, so that $CaCl_2$ is always present in excess. The solutions emerge closely above the rotor of the Kotthoff mill, which rotates at 2800 revolutions per minute, and are immediately further diluted and reacted with the water or the reaction solution continuously forming in the precipitating vessel, which reaction solution is sucked in by the rotor from above and forced through the slots of the stator. The precipitate issuing through the overflow pipe of the precipitation vessel is collected in a tank of larger dimensions and filtered off after some hours, washed and dried at about 110° C. After grinding in a high speed pin mill, a very loose calcium silicate of a surface area of 110 m.²/g. is obtained; this value corresponds to an average particle size of below 250 A. The product is capable of attaining good reinforcing effects in natural rubber and other elastomers.

The accompanying diagrammatic drawing illustrates one embodiment of the milling apparatus (Kotthoff mill) suitable for carrying out the herein described process.

Figure 1:
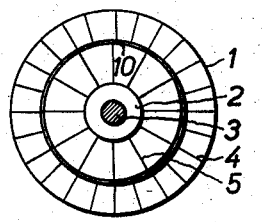
Fig. 1 is a top view of the main parts of the milling apparatus.

The main parts of the milling apparatus are the stationary casing (stator) 1 and the rotor 2 rotating within the casing 1. The rotor 2 consists of a disk the periphery of which is provided with several radial blades 5. The upper and lower ends of the blades 5 are stiffened by a ring 10 each. The rotor 2 is attached to the shaft 3. The stator 1 which encloses the rotor 2, has openings at the bottom and at the top of equal size, and is equipped with a number of peripheral deflecting plates 4 which are arranged in radial direction. The number of the deflecting plates 4 and the blades 5 depends upon the mixing purpose. The stator 1 has a detachable upper part 11 which is connected to an engine flange (not shown in the drawing) by means of the rods 6. The detachable joint of the casing 1 with the upper part 11 of the casing is effected for instance by a slide lock or bolts.

Figure 2:
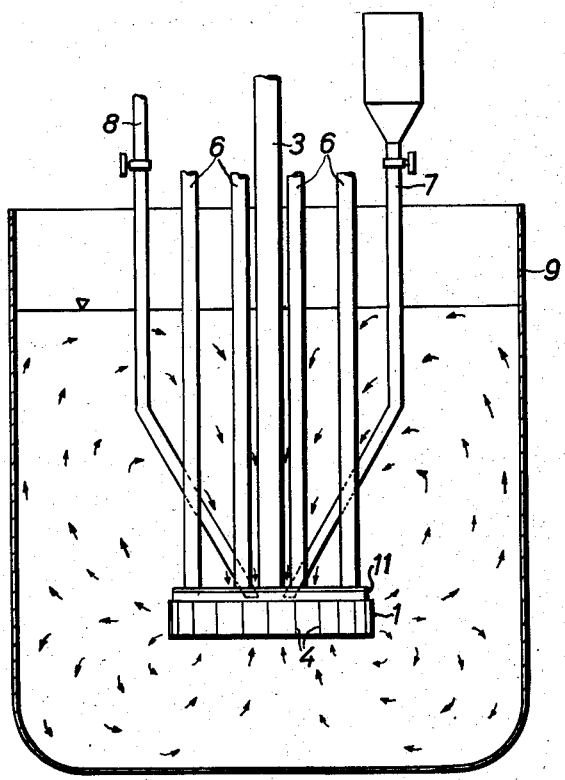
Fig. 2 is a side elevation of the milling apparatus installed in a casing.

As shown in Fig. 2, the milling apparatus is installed within a container 9 which contains an aqueous suspension of the reaction product. The water glass is admitted via the feed pipe 7 whereas the calcium chloride solution is admitted via the feed pipe 8. Upon rotation of the rotor 2 the material to be mixed is sucked through the opening of the upper part 11 of the stator 1—the feed pipes 7 and 8 deliver into the rotor closely by the aforesaid opening of the upper part 11—and through the opening at the bottom of the stator 1 into the rotor 2, as is indicated by the arrows in Fig. 2. The material to be mixed, which is sucked in from above and from below, is brought to the desired high circumferential velocity by means of the blades 4, and forced out from the stator laterally after impinging almost vertically on the stationary deflecting plates 4 of the stator 1.

We claim:

1. A method of preparing calcium silicate which comprises establishing an aqueous pool, rapidly rotating a liquid zone of said pool disposed below the liquid level of the pool and thereby establishing a rapidly rotating zone of high shear in the pool and creating streams of aqueous medium flowing outwardly from said zone in a lateral direction toward the edge of the pool, then upward toward the top of the pool, and then downward into said zone, and introducing sodium silicate and calcium chloride directly into said rapidly rotating zone whereby sodium silicate reacts with the calcium chloride in said zone and is mixed with said aqueous stream and becomes a part thereof and avoiding the establishment of an excess of sodium silicate in said zone.

2. A method of preparing calcium silicate which comprises establishing an aqueous pool of calcium chloride solution, rapidly rotating a liquid zone in said pool disposed well below the liquid level of the pool and thereby establishing a rapidly rotating zone of high shear in the pool and creating streams of aqueous calcium chloride solution which flow outwardly from said zone in a lateral direction toward the edge of the pool, then upward toward the top of the pool, and then downward into said zone, and introducing sodium silicate directly into said rapidly rotating zone whereby sodium silicate reacts with calcium chloride in said stream flowing into said zone and the reaction products are mixed with and become a part of said stream and maintaining an excess of calcium chloride in said zone throughout substantially the entire period of the process.

3. The process of claim 2 wherein the sodium silicate solution is from 0.1 to 0.7 molar and the concentration of the calcium chloride is proportioned so that the concentration of calcium silicate in the reaction mixture is 0.05 to 0.4 molar.

4. A method of preparing calcium silicate which comprises establishing an aqueous pool of calcium chloride solution, rapidly rotating a liquid zone in said pool disposed below the liquid level of the pool and thereby establishing a rapidly rotating zone of high shear in the pool and creating streams of aqueous calcium chloride solution which flow outwardly from said zone in a lateral direction toward the edge of the pool, then in a vertical direction, and then back into said liquid zone, and introducing sodium silicate directly into said rapidly rotating zone whereby sodium silicate reacts with calcium chloride in said stream flowing into said zone and the reaction products are mixed with and become a part of said stream, and maintaining an excess of calcium chloride in said zone throughout substantially the entire period of the process.

5. A method of preparing calcium silicate which comprises establishing an aqueous pool of calcium chloride solution, rapidly rotating a liquid zone in said pool disposed well below the liquid level of the pool and thereby establishing a rapidly rotating zone of high shear in the pool and creating streams of aqueous calcium chloride solution which flow outwardly from said zone in a lateral direction toward the edge of the pool, then downward toward the bottom of the pool, and then upward into said zone, and introducing sodium silicate directly into said rapidly rotating zone whereby sodium silicate reacts with calcium chloride in said stream flowing into said zone and the reaction products are mixed with and become a part of said stream, and maintaining an excess of calcium chloride in said zone throughout substantially the entire period of the process.

References Cited in the file of this patent

UNITED STATES PATENTS

| | | |
|---|---|---|
| 2,204,113 | Allen | June 11, 1940 |
| 2,278,590 | Ruthruff | Apr. 7, 1942 |
| 2,287,700 | Muskat | June 23, 1942 |
| 2,334,812 | Detrick et al. | Nov. 23, 1943 |
| 2,537,908 | Pechukas | Jan. 9, 1951 |
| 2,541,221 | Edwards | Feb. 13, 1951 |
| 2,673,075 | Borck | Mar. 23, 1954 |
| 2,738,174 | Magnant et al. | Mar. 13, 1956 |
| 2,754,547 | Allen | July 17, 1956 |

FOREIGN PATENTS

| | | |
|---|---|---|
| 570,856 | Germany | Feb. 22, 1933 |